(12) United States Patent
Kim et al.

(10) Patent No.: US 12,206,271 B2
(45) Date of Patent: Jan. 21, 2025

(54) BATTERY CHARGE CONTROL DEVICE AND METHOD

(71) Applicant: LG ENERGY SOLUTION, LTD., Seoul (KR)

(72) Inventors: Young Deok Kim, Daejeon (KR); Dae Soo Kim, Daejeon (KR); Hyun Jun Choi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 483 days.

(21) Appl. No.: 17/629,708

(22) PCT Filed: Jan. 29, 2021

(86) PCT No.: PCT/KR2021/001231
§ 371 (c)(1),
(2) Date: Jan. 24, 2022

(87) PCT Pub. No.: WO2021/154043
PCT Pub. Date: Aug. 5, 2021

(65) Prior Publication Data
US 2022/0278540 A1 Sep. 1, 2022

(30) Foreign Application Priority Data
Jan. 31, 2020 (KR) .................. 10-2020-0012123

(51) Int. Cl.
H02J 7/00 (2006.01)
(52) U.S. Cl.
CPC .......... *H02J 7/0048* (2020.01); *H02J 7/0063* (2013.01); *H02J 7/00712* (2020.01)

(58) Field of Classification Search
CPC .... H02J 7/0048; H02J 7/0063; H02J 7/00712; H02J 7/005; H02J 7/007182;
(Continued)

(56) References Cited

U.S. PATENT DOCUMENTS 6,329,789 B1 12/2001 Gavrilov et al.
6,509,720 B2 * 1/2003 Ikeda .................... H02J 7/1446
320/135
(Continued)

FOREIGN PATENT DOCUMENTS

CN 109994792 A 11/2024
JP 2010075024 A * 4/2010 ............. Y02E 60/12
(Continued)

OTHER PUBLICATIONS

International Search Report for PCT/KR2021/001231 (PCT/ISA/210) mailed on May 4, 2021.
(Continued)

*Primary Examiner* — M Baye Diao
(74) *Attorney, Agent, or Firm* — Birch, Stewart, Kolasch & Birch, LLP

(57) ABSTRACT

A battery charge and discharge control device according to an embodiment of the present disclosure includes a state-of-charge (SOC) measurer measuring a SOC of a battery and a charge and discharge controller controlling a charging speed of the battery in response to the SOC of the battery being included in a preset SOC section, and the preset SOC section has change in resistance or a change in potential due to ions inserted into a material constituting the battery equal to or greater than a reference value.

15 Claims, 8 Drawing Sheets

| | TEST 1 | TEST 2 | |
|---|---|---|---|
| CHARGING | 1C | SOC 0~55 | 1.14C |
| | | SOC 55~65 | 0.33C |
| | | SOC 65~100 | 1.14C |
| CHARGING TIME | 1 HOUR | 1 HOUR | |
| DISCHARGING | 0.33C | | |
| CYCLE PERFORMANCE (@25cycle) | 81% | 84% | |

(58) Field of Classification Search
CPC ..... H02J 7/007184; H01M 2010/4271; H01M 10/425; H01M 4/587; H01M 10/44; H01M 10/48; H01M 10/42; H01M 10/0525
USPC .......................................................... 320/128
See application file for complete search history.

(56) References Cited

U.S. PATENT DOCUMENTS

| | | | |
|---|---|---|---|
| 9,368,995 B2* | 6/2016 | Nishino | H02J 7/0071 |
| 10,170,803 B2* | 1/2019 | Kanada | B60L 58/15 |
| 10,605,870 B2* | 3/2020 | Kim | H02J 7/00714 |
| 11,251,472 B2* | 2/2022 | Gorlin | H01M 10/052 |
| 2013/0038290 A1 | 2/2013 | Chatroux et al. | |
| 2014/0375279 A1* | 12/2014 | Nishino | H01M 10/44 320/160 |
| 2015/0301123 A1* | 10/2015 | Tao | H02J 7/00 324/426 |
| 2016/0372800 A1* | 12/2016 | Kanada | B60L 58/16 |
| 2017/0244255 A1 | 8/2017 | Luo et al. | |
| 2018/0013179 A1 | 1/2018 | Nomura et al. | |
| 2018/0145531 A1 | 5/2018 | Jung et al. | |
| 2018/0226693 A1 | 8/2018 | Hong et al. | |
| 2019/0195956 A1 | 6/2019 | Lim et al. | |
| 2019/0202299 A1 | 7/2019 | Oh et al. | |
| 2021/0053450 A1 | 2/2021 | Oh et al. | |
| 2021/0135479 A1 | 5/2021 | Hong et al. | |
| 2021/0156923 A1 | 5/2021 | Nam et al. | |
| 2021/0184274 A1 | 6/2021 | Park et al. | |

FOREIGN PATENT DOCUMENTS

| | | |
|---|---|---|
| JP | 2013-51809 A | 3/2013 |
| JP | 2014-22317 A | 2/2014 |
| JP | 2014-68467 A | 4/2014 |
| JP | 2016-123251 A | 7/2016 |
| JP | 2017-116336 A | 6/2017 |
| KR | 10-0396490 B1 | 9/2003 |
| KR | 10-2011-0015880 A | 2/2011 |
| KR | 10-1525937 B1 | 6/2015 |
| KR | 10-2017-0099378 A | 8/2017 |
| KR | 10-2018-0004991 A | 1/2018 |
| KR | 10-2018-0048281 A | 5/2018 |
| KR | 10-2018-0056238 A | 5/2018 |
| KR | 10-2018-0091541 A | 8/2018 |
| KR | 10-2019-0025320 A | 3/2019 |
| KR | 10-2019-0081237 A | 7/2019 |
| KR | 10-2019-0084686 A | 7/2019 |
| WO | WO 2013/046690 A1 | 4/2013 |

OTHER PUBLICATIONS

Extended European Search Report for European Application No. 21747042.6, dated Oct. 18, 2022.

* cited by examiner

BATTERY CHARGE CONTROL DEVICE AND METHOD

CROSS-REFERENCE TO RELATED APPLICATIONS

This application claims the benefit of Korean Patent Application No. 10-2020-0012123, filed on Jan. 31, 2020, in the Korean Intellectual Property Office, the disclosure of which is incorporated herein in its entirety by reference.

TECHNICAL FIELD

Technical Field

The present disclosure relates to a device and method for controlling charge and discharge of a battery.

Background Art

In recent years, research and development for secondary batteries have been actively conducted. Here, the secondary battery is a battery capable of recharging and discharging, and in its meaning, includes all of the existing Ni/Cd battery, the Ni/MH battery, and the like and a recent lithium-ion battery. Among secondary batteries, lithium-ion batteries have the advantage of having much higher energy density than the existing Ni/Cd batteries and Ni/MH batteries. In addition, lithium-ion batteries may be manufactured in a small size and light weight, and accordingly, may be used as power sources for mobile devices. In addition, the lithium-ion batteries have expanded their range of use to power sources for electric vehicles, making the batteries attract attention as a next-generation energy storage medium.

In addition, the secondary battery is generally used as a battery pack including a battery module in which a plurality of battery cells are connected in series and/or in parallel. The state and operation of the battery pack are managed and controlled by a battery management system.

For the lithium ion battery, graphite is mainly used for the negative electrode. When lithium ions are inserted into graphite during operation of the battery, in general, the insertion is performed in stages step by step in order to minimize energy. Among the stages, the largest changes in insertion resistance and potential appear in stage II.

As described above, as lithium ions are inserted into graphite step by step, the change in resistance and the change in potential appear different for each stage, and thus charging efficiency is also inevitably different for each stage. Therefore, when the charging speed is simply kept constant, the cycle performance is relatively degraded.

DISCLOSURE OF THE INVENTION

Technical Problem

The present disclosure has been made to solve the above problems, and an object of the present disclosure is to provide a battery charge and discharge control device and method capable of improving cycle performance by controlling a charging speed in a stage section showing a rapid change in insertion resistance and a change in potential at a negative electrode of the battery.

Technical Solution

A battery charge and discharge control device according to an embodiment of the present disclosure includes a state-of-charge (SOC) measurer measuring a SOC of a battery and a charge and discharge controller controlling a charging speed of the battery in response to the SOC of the battery being included in a preset SOC section, and the preset SOC section has a change in potential due to ions inserted into a material constituting the battery equal to or greater than a reference value.

A battery charge and discharge control method according to an embodiment of the present disclosure is a method for controlling a charging and discharging speed of a battery, the battery charge and discharge control method includes measuring a SOC of the battery and controlling a charging speed of the battery when the SOC of the battery is included in a preset SOC section, and the preset SOC section has a change in resistance or a change in potential due to ions inserted into a material constituting the battery equal to or greater than a reference value.

Effects of the Invention

According to the battery charge and discharge control device and method of the present disclosure, it is possible to improve the cycle performance by controlling the charging speed in the stage section showing rapid changes in insertion resistance and potential at the negative electrode of the battery.

MODE FOR CARRYING OUT THE INVENTION

Figure 1:
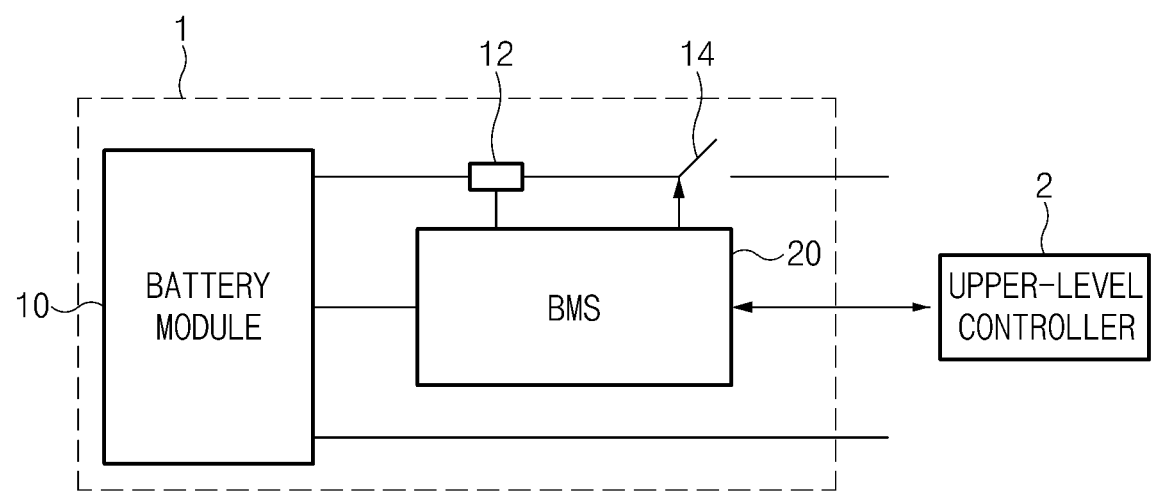
FIG. 1 is a block diagram illustrating a configuration of a battery control system.

Hereinafter, various embodiments of the present disclosure will be described in detail with reference to the accompanying drawings. In the present disclosure, the same reference numerals are used for the same elements in the drawings, and duplicate descriptions for the same elements are omitted.

In various embodiments of the present disclosure disclosed herein, specific structural or functional descriptions are merely exemplary for the purpose of describing embodiments of the present disclosure, and various embodiments of the present disclosure may be implemented in various forms and should not be construed as being limited to the embodiments described herein.

As used in various embodiments, the terms such as "first", "second", "the first", or "the second" may modify various components, regardless of order and/or importance, but do not limit the components. For example, without departing from the scope of the present disclosure, a first element could be termed a second element, and similarly, in reverse, a second element could be termed a first element.

The terms and phrases as used herein are merely provided to describe specific embodiments, and may not be intended to limit the scope of other embodiments. A singular form is intended to include a plural form, unless the context clearly indicates otherwise.

All terms, including technical or scientific terms, as used here, may have the same meaning as commonly understood by a person skilled in the art to which the present disclosure belongs. Terms such as those defined in commonly-used dictionaries should be interpreted as having a meaning that is consistent with their meaning in the context of the relevant art and will not be interpreted in an idealized or overly formal sense unless expressly so defined here. In some cases, even terms defined here cannot be interpreted to exclude embodiments of the present disclosure.

FIG. 1 is a block diagram illustrating a configuration of a battery control system.

Referring to FIG. 1, a battery control system includes a battery pack 1 according to an embodiment of the present disclosure and an upper-level controller 2 included in an upper-level system is schematically illustrated.

As illustrated in FIG. 1, the battery pack 1 may be made of one or more battery cells, and may include a rechargeable battery module 10, a switching unit 14 for controlling a charge and discharge current flow of the battery module 10, the switching unit 14 being connected to a positive (+) terminal or a negative (−) terminal of the battery module 10 in series, and a battery management system (BMS) for controlling and managing by monitoring voltage, current, temperature, or the like of the battery pack 1, as known in the art.

Here, the switching unit 14 is a semiconductor switching element for controlling a current flow for charging or discharging of the battery module 10, and for example, at least one metal-oxide-semiconductor field-effect transistor (MOSFET) may be used.

In addition, in order to monitor the voltage, current, temperature, or the like, of the battery pack 1, the BMS 20 may measure or calculate voltages and currents such as gates, sources, and drains of semiconductor switching elements, and may measure the current, voltage, temperature, or the like, of the battery pack, by using a sensor 12 provided adjacent to a semiconductor switching unit 14. The BMS 20 may be an interface for receiving values obtained by measuring the above-mentioned various parameters, and may include a plurality of terminals, a circuit connected to the terminals to process input values, or the like.

In addition, the BMS 20 may control ON/OFF of the switching unit 14, for example, a MOSFET, and may be connected to the battery module 10 to monitor the status of the battery module 10.

The upper-level controller 2 may transmit a control signal for the battery module to the BMS 20. Accordingly, the operation of the BMS 20 may be controlled based on the signal applied from the upper-level controller. The one or more battery cells described in the present disclosure may be included in a battery pack used in an energy storage system (ESS), a vehicle, or the like. However, it is not limited to the above-mentioned uses.

The configuration of the battery pack 1 and the configuration of the BMS 20 are known, and thus a more detailed description will be omitted.

Figure 2:
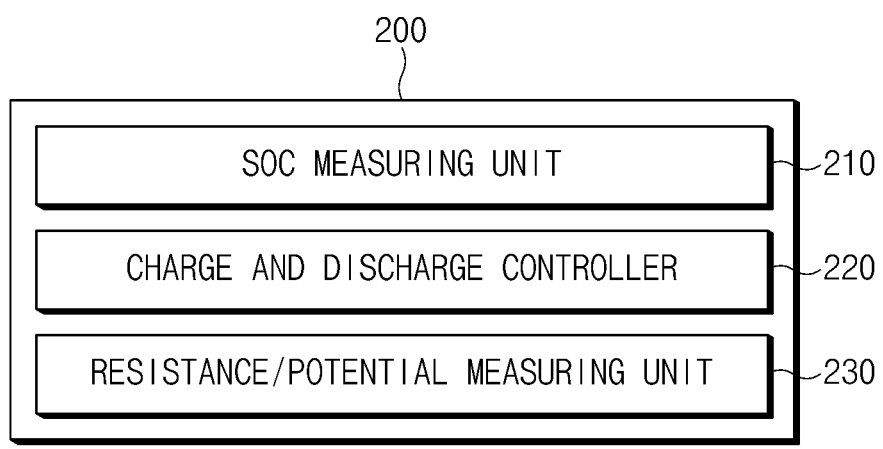
FIG. 2 is a block diagram illustrating a configuration of a battery charge and discharge control device according to an embodiment of the present disclosure.

FIG. 2 is a block diagram illustrating a configuration of a battery charge and discharge control device according to an embodiment of the present disclosure.

Referring to FIG. 2, a battery charge and discharge control device 200 according to an embodiment of the present disclosure may include a state of charge (SOC) measuring unit 210, a charge and discharge controller 220, and a resistance/potential measuring unit 230.

The SOC measuring unit 210 may measure the SOC of a battery. In this case, the SOC measuring unit 210 may calculate the SOC of each battery cell of a battery module based on a voltage measured by a voltage sensor. In addition, the SOC measuring unit 210 may calculate the SOC in consideration of various factors such as the current, temperature, pressure, or the like, of each of the battery cells as well as the voltage of each of the battery cells of the battery module.

Here, the SOC measurement method for the battery cell may be classified based on a parameter used as a reference for determining a residual amount. The Ampere hour (Ah) method is a method of calculating a used capacity by using a relationship between the current used and time and reflecting the calculated capacity in the SOC, and the resistance measurement method is a method of calculating a residual amount based on a relationship between an internal resistance (IR-drop) of the battery and the SOC. In addition, the voltage measurement method is a method of measuring an open circuit voltage (OCV) of a terminal of a battery cell and calculating a residual amount based on the relationship between the OCV and SOC, which is measured in advance.

For example, for the battery charge and discharge control device 200 according to an embodiment of the present disclosure, the SOC may be calculated by using the voltage measurement method. However, this is only exemplary, and the SOC calculation method is not limited to the above-described methods.

The charge and discharge controller 220 may control a charging speed of the battery when the SOC of the battery, which is measured by the SOC measuring unit 210, is included in a preset section. In this case, the preset section may be determined as a section in which a change in resistance or a change in potential due to ions inserted into a material constituting the battery is equal to or greater than a certain reference value. For example, the preset section may be determined as a section with the largest inflection point in a graph of voltage differential (dV/dQ) (y-axis) and capacity (x-axis) with respect to battery capacity. Alternatively, the preset section may be determined as a section with the largest slope in a graph of the potential (y-axis) of the battery and the SOC (x-axis).

Here, as the materials constituting the battery, a material included in a negative electrode of the battery, and may be, for example, graphite, and in this case, the ions inserted into the graphite may be lithium ions. In addition, the preset section may be determined as a section in which resistance is greatest during charging the battery. For example, the preset section may be determined based on a section in which the change in resistance due to insertion of lithium ions into graphite is greatest. Alternatively, the preset section may be determined in consideration of the error range for the section in which the change in resistance due to the insertion of lithium ions into the graphite is greatest; for example, for the graphite, the preset section may be a SOC section corresponding to the stage II among stages for inserting lithium ions into the graphite, and in this case, the SOC of the battery may be determined as 55% to 65% including the error range.

Specifically, the charge and discharge controller 220 may decrease the charging speed when the SOC of the battery is included in the preset section, and may increase the charging speed in remaining sections other than the preset section. For example, the charge and discharge controller 220 may perform charging at a speed of 0.33 C in the preset section, and may perform charging at a speed of 1.14 C in remaining sections other than the preset section. In this case, the charge and discharge controller 220 may maintain a total charging time of the battery to be equal to an initial set charging time of the battery.

The resistance/potential measuring unit 230 may measure resistance and potential to detect a section in which the material (e.g., graphite) constituting the negative electrode of the battery shows the greatest change in insertion resistance or change in potential. However, the battery charge and discharge control device 200 according to an embodiment of the present disclosure does not necessarily have the resistance/potential measuring unit 230, and the above-described section may be measured in advance and stored in a separate memory unit in advance.

As described above, with the battery charge and discharge control device according to an embodiment of the present disclosure, it is possible to improve the cycle performance by controlling the charging speed in the stage section showing rapid changes in insertion resistance and potential at the negative electrode of the battery.

Figure 3A:
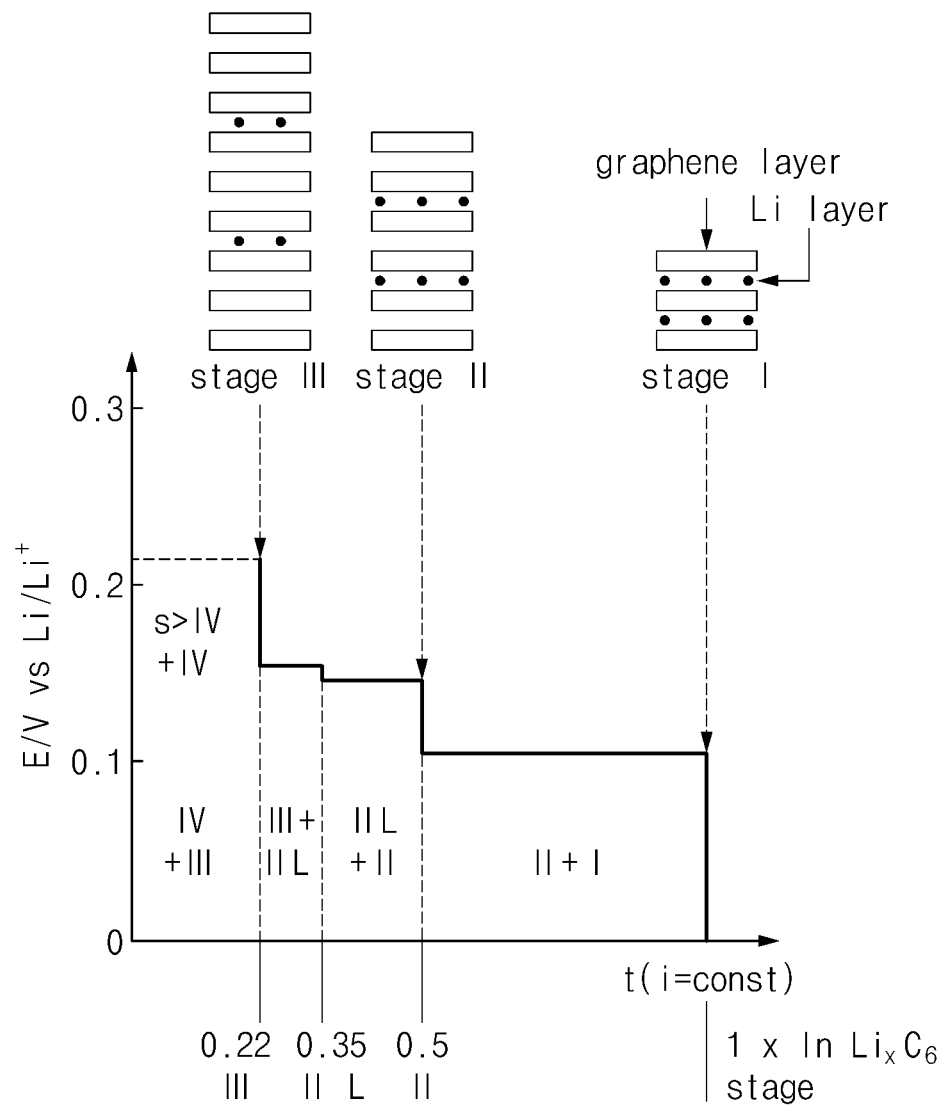
FIG. 3A shows a constant current curve when lithium ions are inserted between graphite.
Figure 3B:
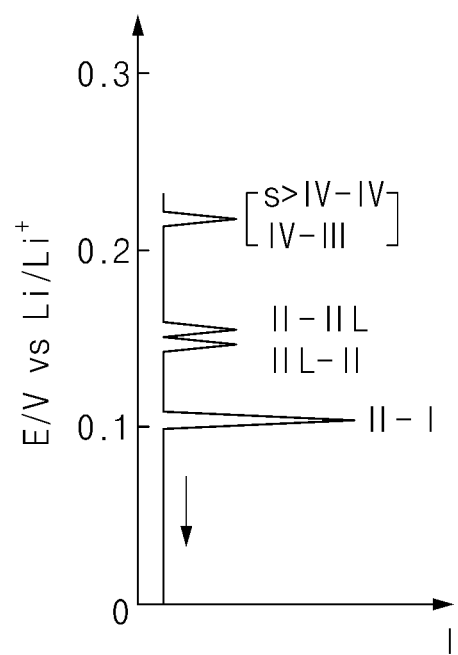
FIG. 3B shows a current-potential curve.

FIG. 3A shows a constant current curve when lithium ions are inserted between graphite, and FIG. 3B shows a current-potential curve. At this time, in FIG. 3A, the horizontal axis represents time and the vertical axis represents potential. In addition, in FIG. 3B, the horizontal axis represents current, and the vertical axis represents potential.

Referring to FIGS. 3A and 3B, it can be seen that a staging phenomenon appears over time when lithium ions are inserted into layers of graphite constituting the negative electrode of the battery. At this time, as shown in FIGS. 3A and 3B, the greatest changes in potential resistance appear in stage II.

Figure 4:
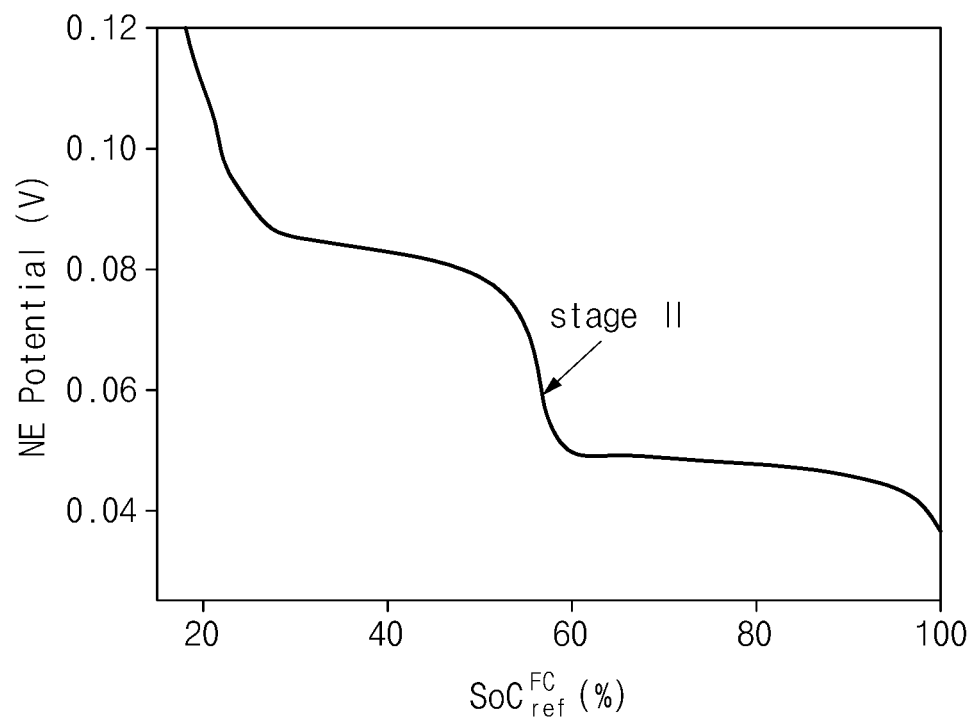
FIG. 4 is a diagram illustrating a change in potential for SOC when lithium ions are inserted between graphite.

FIG. 4 is a diagram illustrating a change in potential for SOC when lithium ions are inserted between graphite. At this time, in FIG. 4, the horizontal axis represents the SOC (%) of the battery and the vertical axis represents potential.

Referring to FIG. 4, it can be seen that the slope of the graph is the largest in the stage II section where the SOC is 50 to 60%. That is, the greatest potential change and resistance change may occur in the stage II section of FIG. 4. However, this is only exemplary, and the range of the SOC may differ depending on the design of the battery cell.

Figure 5:
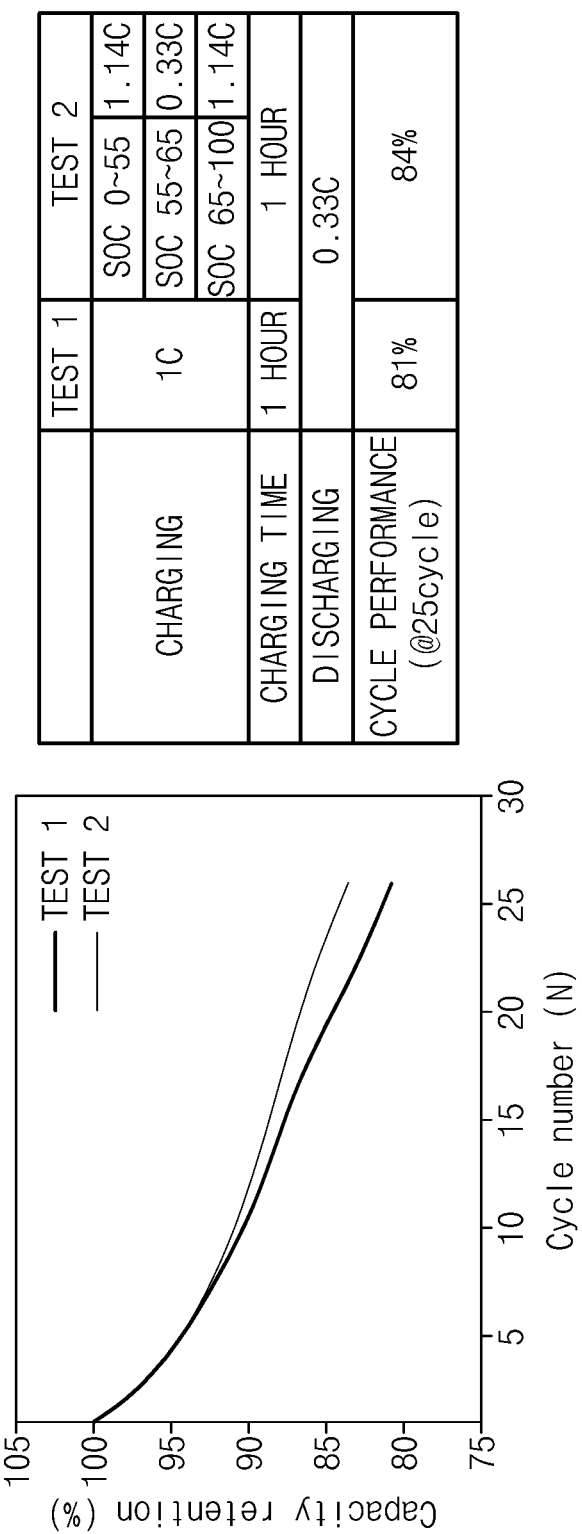
FIG. 5 is a diagram illustrating a result of performing charge and discharge cycles according to each of a charging method in the related art and a battery charging method according to an embodiment of the present disclosure.

FIG. 5 is a diagram illustrating a result of performing charge and discharge cycles according to each of a charging method in the related art and a battery charging method according to an embodiment of the present disclosure. At this time, in a graph of FIG. 5, the horizontal axis represents the charging cycle (N), and the vertical axis represents the capacity retention (%).

At this time, TEST 1 of FIG. 5 shows that the cycle was performed by charging at 1 C and discharging at 0.33 C (comparative example). Meanwhile, TEST 2 shows that the cycle was performed by charging at 0.33 C in a SOC 55-65 section, which has the largest resistance during charging, by the battery charging method according to an embodiment of the present disclosure, and by charging at 1.14 C in remaining sections and discharging at 0.33 C (embodiment). At this time, the total charging time was set to be the same for both TEST 1 and TEST 2, and the charging cycle was performed a total of 25 times.

As illustrated in FIG. 5, it can be seen that the cycle performance was 84%, which means that a 3% improvement is achieved compared to the method in the related art by reducing the charging speed in the SOC 55-65 section in which the insertion resistance by lithium ions rapidly increases, even though the total charging time is the same.

Figure 6:
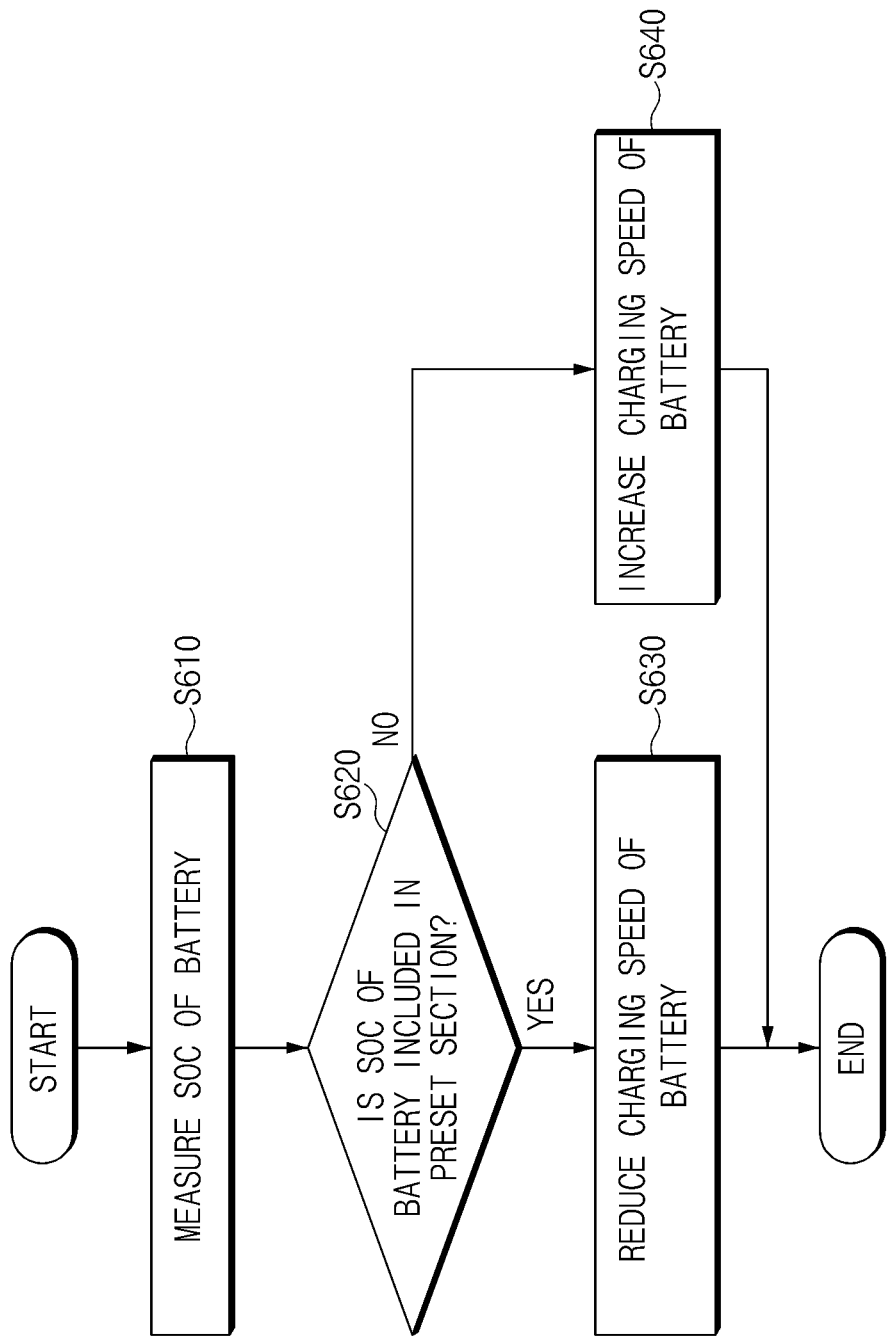
FIG. 6 is a flowchart illustrating a battery charge and discharge control method according to an embodiment of the present disclosure.

FIG. 6 is a flowchart illustrating a battery charge and discharge control method according to an embodiment of the present disclosure.

Referring to FIG. 6, first, the SOC of the battery is measured (S610). In this case, in step S610, the SOC may be measured in consideration of various factors such as the voltage, temperature, pressure, or the like, of each battery cell. In addition, the SOC of the battery may be calculated through the aforementioned Ah method, resistance measurement method, voltage measurement method, and the like.

Then, a determination is made whether the measured SOC of the battery is included in the preset section (S620). In this case, the preset section may be determined as a section in which a change in resistance or a change in potential due to ions inserted into a material constituting the battery is equal to or greater than the reference value. For example, in the case of graphite, the preset section may be a SOC section (e.g., SOC 55-65) corresponding to the stage II among the stages in which lithium ions are inserted into the graphite.

If the SOC of the battery is included in the preset section (YES), the charging speed of the battery is reduced (S630). Meanwhile, if the SOC of the battery is not included in the preset period (NO), the charging speed of the battery is increased (S640). For example, in step S630 and S640, charging may be performed at a speed of 0.33 C in the preset section, and charging may be performed at a speed of 1.14 C in remaining sections other than the preset section. In this case, the total charging time of the battery may be maintained to be equal to an initial set charging time of the battery.

As described above, with the battery charge and discharge control method according to the present disclosure, it is possible to improve the cycle performance by controlling the charging speed in the stage section showing rapid changes in insertion resistance and potential at the negative electrode of the battery.

Figure 7:
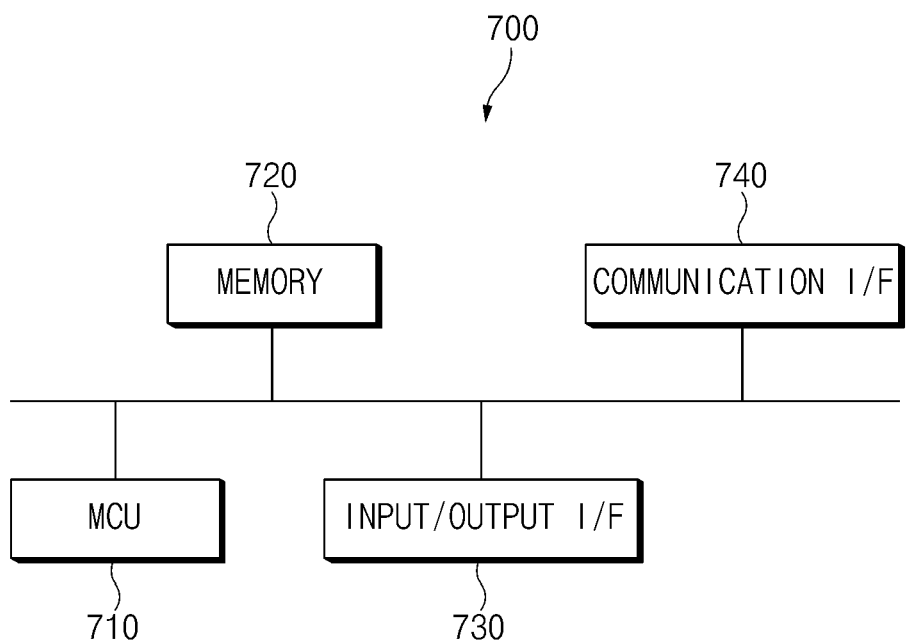
FIG. 7 is a diagram illustrating a hardware configuration of a battery diagnostic device according to an embodiment of the present disclosure.

FIG. 7 is a diagram illustrating a hardware configuration of a battery control device according to an embodiment of the present disclosure.

Referring to FIG. 7, a control diagnostic device 700 may include a microcontroller (MCU) 710 controlling various processes and configurations, a memory 720 in which operating system programs and various programs (e.g., a battery charge and discharge control program, or the like) are recorded, an input/output interface 730 for providing an input interface and an output interface between the battery cell module and/or the semiconductor switching elements, and a communication interface 740 capable of communicating with the outside through a wired or wireless communication network. As described above, the computer program according to the present disclosure may be recorded in the memory 720 and processed by the microcontroller 710, so that it may be implemented as a module that performs each functional block illustrated in FIG. 2.

In the description above, although all components constituting the aspects of the present disclosure have been described as being combined into one unit or operated in combination, the present disclosure is not necessarily limited to such aspects. That is, within the objective scope of the present disclosure, one or more components may be selectively and operatively combined in any number.

In addition, terms such as "include", "comprise", or "have" described above mean that the corresponding component can be present unless otherwise stated, and thus it should be construed that other components may be further included rather than excluding other components. All terms including technical or scientific terms have the same meaning as commonly understood by those of ordinary skill in the art to which the embodiments of the present disclosure belong, unless otherwise defined. Terms commonly used such as those defined in dictionaries should be interpreted as having a meaning that is consistent with their meaning in the context of the related art and will not be interpreted in an idealized or overly formal sense unless expressly so defined in the present disclosure.

The above description is merely illustrative of the technical idea of the present disclosure, and those of ordinary skill in the art to which the present disclosure pertains will be able to make various modifications and variations without departing from the essential characteristics of the present disclosure. Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the accompanying claims, and all technical ideas within the scope equivalent thereto should be construed as being included in the scope of the present disclosure.

The invention claimed is:

1. A battery charge and discharge control device comprising:
   a state-of-charge (SOC) measurer configured to measure a SOC of a battery; and
   a charge controller configured to control a charging speed of the battery in response to the SOC of the battery being included in a preset SOC section,
   wherein the preset SOC section has a change in resistance or a change in potential due to ions inserted into a material constituting the battery equal to or greater than a reference value,
   wherein the charge controller controls a charging speed of the battery before and after the preset SOC section to be higher than the charging speed of the battery during the preset SOC section, and
   wherein the charging speed of the battery before and after the preset SOC section are approximately identical to each other.

2. The battery charge and discharge control device of claim 1, wherein the charge controller decreases the charging speed of the battery when the SOC of the battery is included in the preset SOC section, and increases the charging speed of the battery in remaining SOC sections other than the preset SOC section.

3. The battery charge and discharge control device of claim 1, wherein the charge controller performs charging at a first speed in the preset SOC section, and performs charging at a second speed greater than the first speed in remaining SOC sections other than the preset SOC section.

4. The battery charge and discharge control device of claim 1, wherein the charge controller maintains a total charging time of the battery to be equal to an initial set charging time of the battery.

5. The battery charge and discharge control device of claim 1, wherein the material constituting the battery is included in a negative electrode of the battery.

6. The battery charge and discharge control device of claim 1, wherein the material constituting the battery includes graphite, and the ions include lithium ions.

7. The battery charge and discharge control device of claim 6, wherein the preset SOC section corresponds to stage II among stages for inserting the lithium ions into the graphite.

8. The battery charge and discharge control device of claim 1, wherein the preset SOC section has a greatest change in resistance due to insertion of lithium ions into graphite.

9. The battery charge and discharge control device of claim 1, wherein the preset SOC section has a greatest change in the potential due to insertion of the ions into the material.

10. The battery charge and discharge control device of claim 1, wherein the preset SOC section has a SOC of at least approximately 50%.

11. A battery charge and discharge control method for controlling a charging and discharging speed of a battery, the battery charge and discharge control method comprising:
    measuring a state-of-charge (SOC) of the battery; and
    controlling a charging speed of the battery when the SOC of the battery is included in a preset SOC section,
    wherein the preset SOC section has a change in resistance or a change in potential due to ions inserted into a material constituting the battery equal to or greater than a reference value,
    wherein the charge controller controls a charging speed of the battery before and after the preset SOC section to be higher than the charging speed of the battery during the preset SOC section, and
    wherein the charging speed of the battery before and after the preset SOC section are approximately identical to each other.

12. The battery charge and discharge control method of claim 11, wherein the controlling of the charging speed of the battery includes decreasing the charging speed when the SOC of the battery is included in the preset SOC section and increasing the charging speed in remaining SOC sections other than the preset SOC section.

13. The battery charge and discharge control method of claim 11, wherein a total charging time of the battery is maintained to be equal to an initial set charging time of the battery.

14. The battery charge and discharge control method of claim 11, wherein the preset SOC section has a greatest change in the potential due to insertion of the ions into the material.

15. The battery charge and discharge control method of claim 11, wherein the preset SOC section has a SOC of at least approximately 50%.

* * * * *